(12) United States Patent
Kim et al.

(10) Patent No.: US 7,824,093 B2
(45) Date of Patent: Nov. 2, 2010

(54) BACKLIGHT ASSEMBLY, LIQUID CRYSTAL DISPLAY DEVICE HAVING THE SAME, AND METHOD OF MANUFACTURING THEREOF

(75) Inventors: Heu-Gon Kim, Suwon-si (KR); Byung-Seo Yoon, Incheon (KR); In-Sun Hwang, Suwon-si (KR); Taek-Sun Shin, Cheonan-si (KR); Hyoung-Joo Kim, Euiwang-si (KR); Seung-Hwan Chung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 363 days.

(21) Appl. No.: 11/865,945

(22) Filed: Oct. 2, 2007

(65) Prior Publication Data

US 2009/0180300 A1   Jul. 16, 2009

(30) Foreign Application Priority Data

Oct. 2, 2006 (KR) ............................... 2006-97080
Oct. 2, 2007 (KR) ..................... 10-2007-0099058

(51) Int. Cl.
*F21V 7/04* (2006.01)
*F21V 13/04* (2006.01)
*G02B 6/34* (2006.01)

(52) U.S. Cl. ....................... 362/626; 362/607; 362/620

(58) Field of Classification Search ................. 362/606, 362/607, 619, 620, 625, 626
See application file for complete search history.

(56) References Cited

U.S. PATENT DOCUMENTS

| 6,123,431 A | * | 9/2000 | Teragaki et al. | ............. 362/625 |
| 6,151,169 A | * | 11/2000 | Kim | ........................... 362/620 |
| 6,231,200 B1 | * | 5/2001 | Shinohara et al. | ........... 362/619 |
| 6,454,452 B1 | * | 9/2002 | Sasagawa et al. | ........... 362/626 |
| 6,616,290 B2 | * | 9/2003 | Ohkawa | ...................... 362/619 |
| 7,056,005 B2 | * | 6/2006 | Lee | .............................. 362/625 |
| 2005/0046321 A1 | * | 3/2005 | Suga et al. | .................. 313/112 |

* cited by examiner

*Primary Examiner*—Alan Cariaso
(74) *Attorney, Agent, or Firm*—Cantor Colburn LLP

(57) ABSTRACT

A backlight assembly includes a light source, a light-guide plate (LGP), a reflective sheet and at least one optical sheet. The light source emits light. The LGP includes a light-incident surface, a light-reflecting surface and a light-emitting surface. The light-incident surface receives the light from the light source. The light-reflecting surface has a plurality of first prism patterns spaced apart from each other and flat portions formed between the first prism patterns, which are substantially perpendicular to the light-incident surface. The light-emitting surface has a plurality of second prism patterns formed thereon. The reflective sheet is disposed below the LGP. At least one optical sheet is disposed on the LGP.

28 Claims, 14 Drawing Sheets

BACKLIGHT ASSEMBLY, LIQUID CRYSTAL DISPLAY DEVICE HAVING THE SAME, AND METHOD OF MANUFACTURING THEREOF

This application claims priority to Korean Patent Application No. 2006-97080 filed on Oct. 2, 2006, and Korean Patent Application No. 2007-99058 filed on Oct. 2, 2007, and all the benefits accruing therefrom under 35 U.S.C. §119, the contents of which are herein incorporated by reference in their entireties.

BACKGROUND OF THE INVENTION

1. Field of the Invention

The present invention relates to a backlight assembly, a liquid crystal display ("LCD") device having the backlight assembly, and a method of manufacturing the backlight assembly. More particularly, the present invention relates to a backlight assembly capable of increasing luminance and decreasing manufacturing costs, an LCD device having the backlight assembly, and a method of manufacturing the backlight assembly.

2. Description of the Related Art

A LCD device displays an image using liquid crystal that has optical characteristics such as refractivity index anisotropy and electrical characteristics such as dielectric constant anisotropy. The LCD device has various characteristics, such as thinner thickness, lower driving voltage, lower power consumption, etc., than other display devices such as cathode ray tube ("CRT") devices, plasma display panel ("PDP") devices, etc. Therefore, the LCD device has been widely used in various industrial fields.

The LCD device is a non-emissive type display device, so that the LCD device necessarily requires a light source such as a backlight assembly to supply the LCD panel of the LCD device with light.

A conventional backlight assembly includes a light source that generates light, a light-guide plate ("LGP") that guides a path of the light that is generated from the light source to be incident into the LCD panel, and a reflective sheet disposed below the LGP.

However, in order to enhance luminance and uniformity of the light exiting from the LGP, the backlight assembly has many optical sheets such as a diffusion sheet, a prism sheet, a protection sheet, etc. As a result, manufacturing costs of the backlight assembly is increased, and thickness of the backlight assembly is increased.

BRIEF SUMMARY OF THE INVENTION

Exemplary embodiments of the present invention provide a backlight assembly capable of increasing luminance and decreasing manufacturing costs thereof. Exemplary embodiments of the present invention also provide a LCD device having the backlight assembly, and method of manufacturing the backlight assembly.

In one aspect of the present invention, a backlight assembly includes a light source, a light-guide plate ("LGP"), a reflective sheet and at least one optical sheet. The light source emits light. The LGP includes a light-incident surface, a light-reflecting surface and a light-emitting surface. The light-incident surface receives the light from the light source. The light-reflecting surface has a plurality of first prism patterns spaced apart from each other and a plurality of flat portions each of which is formed between the first prism patterns. The flat portions are substantially perpendicular to the light-incident surface. The light-emitting surface has a plurality of second prism patterns formed thereon. The reflective sheet is disposed below the LGP. At least one optical sheet is disposed on the LGP.

The LGP may have a thickness stepwise decreasing from the light-incident surface to the light-facing surface. The light-facing surface may be disposed opposite the light-incident surface.

The first prism patterns may have a stripe shape substantially parallel with the light-incident surface.

The first prism patterns may include a first slanted surface, a second slanted surface and a third slanted surface. The first slanted surface may be extended from a first flat portion of the light-reflecting surface toward the light-emitting surface. The first slanted surface may be is inclined with respect to the first flat portion of the light-reflecting surface. The second slanted surface may be extended from the first slanted surface toward the light-reflecting surface. The second slanted surface may be inclined with respect to the first slanted surface. The third slanted surface may be extended from the second slanted surface. The third slanted surface may be connected to a second flat portion of the light-reflecting surface adjacent to the first flat portion. The first and third slanted surfaces may be substantially parallel with each other.

The second prism patterns may have a stripe shape substantially perpendicular to the first prism patterns. An interior angle of each of the second prism patterns may be in a range of about 80° to about 150°.

The optical sheet may include a prism sheet having third prism patterns formed thereon. The third prism patterns may be connected to each other.

The third prism patterns may have a stripe shape substantially parallel with the second prism patterns.

The third prism patterns may have a stripe shape substantially perpendicular to the second prism patterns.

An interior angle of each of the third prism patterns may be in a range of about 80° to about 150°.

A lower surface of the prism sheet may be matted.

The optical sheet may further include a protection sheet disposed on the prism sheet.

The optical sheet may include a diffusion sheet.

In another aspect of the present invention, an LCD device includes a light source, a light guide plate (LGP), a reflective sheet, at least one optical sheet, and an LCD panel. The light source emits light. The LGP may include a light-incident surface, a light-reflecting surface, and a light-emitting surface. The light-incident surface receives the light from the light source. The light-reflecting surface has a plurality of first prism patterns spaced apart from each other and flat portions. Each of the flat portions may be formed between the first prism patterns. The flat portions may be substantially perpendicular to the light-incident surface. The light-emitting surface may include a plurality of second prism patterns formed thereon. The reflective sheet may be disposed below the LGP. At least one optical sheet may be disposed on the LGP. The LCD panel may be disposed on the optical sheet to display an image.

The optical sheet may include a prism sheet.

The optical sheet may include a protection sheet disposed on the prism sheet.

The optical sheet may include a diffusion sheet.

In a further aspect of the present invention a method of manufacturing a backlight assembly is provided. The backlight assembly includes a light source emitting light, a light guide plate (LGP), a reflection sheet disposed below the LGP, and at least one optical member disposed on the LGP. The method may include forming a plurality of first prism patterns on a light-reflecting surface of the LGP, forming a plurality of flat portions between the prism patterns, the flat portions substantially perpendicular to a light-incident surface of the LGP, and forming a plurality of second prism patterns on a light-emitting surface of the LGP. The light-incident surface receives light emitted from the light source.

The LGP may have a thickness stepwise decreasing from the light-incident surface to the light-facing surface and the light-facing surface may be disposed opposite the light-incident surface.

The first prism patterns may have a stripe shape substantially parallel with the light-incident surface.

In exemplary embodiments, the backlight assembly and the LCD device having the backlight assembly provide enhanced luminance of the light and require a fewer number of optical sheets, thereby reducing associated manufacturing costs.

BRIEF DESCRIPTION OF THE DRAWINGS

The above and other, aspects, features, and advantages of the present invention will become readily apparent by reference to the following detailed description when considered in conjunction with the accompanying drawings wherein.

DETAILED DESCRIPTION OF THE INVENTION

Figure 1:
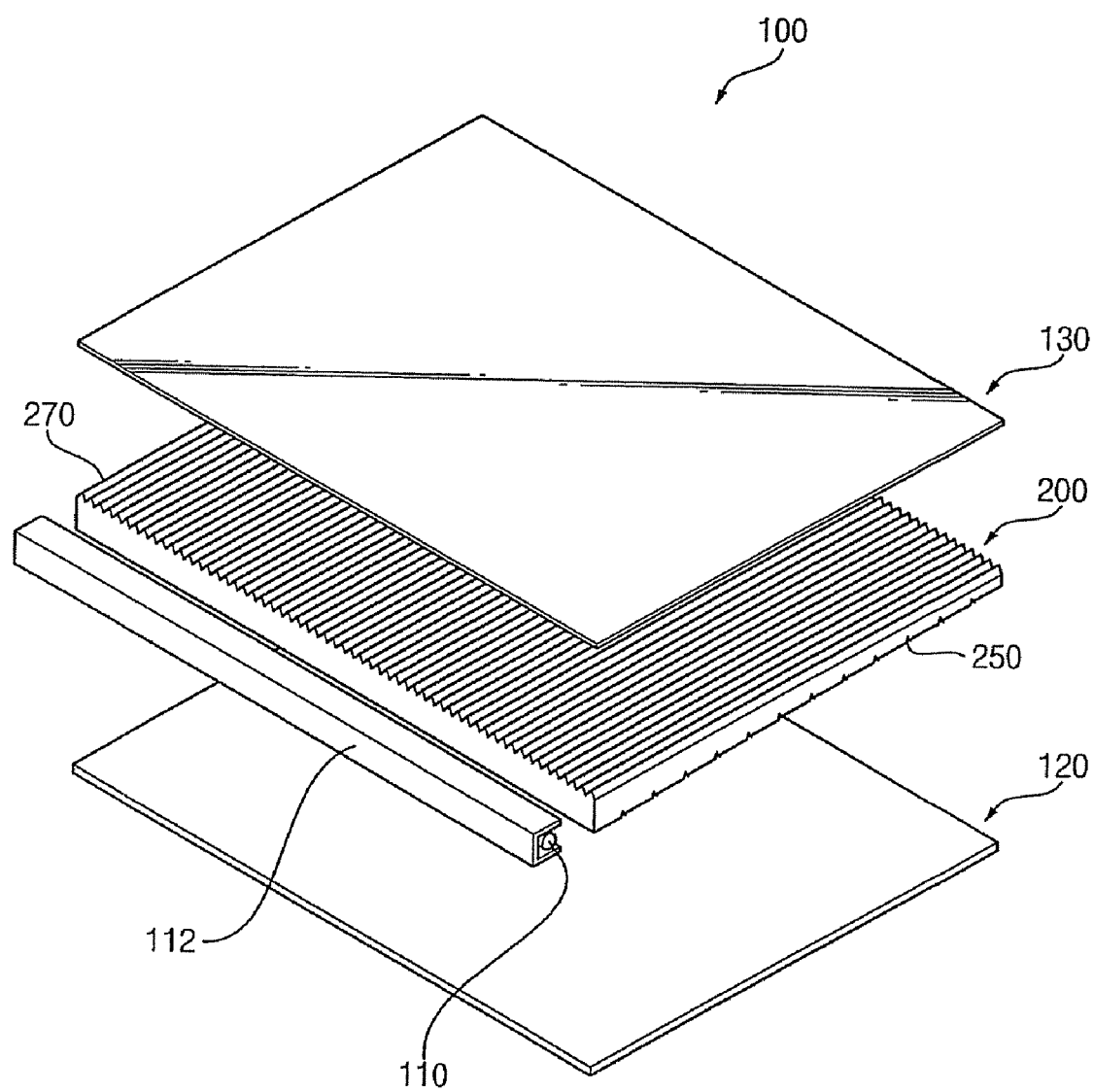
FIG. 1 is an exploded perspective view schematically illustrating a backlight assembly according to an exemplary embodiment of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
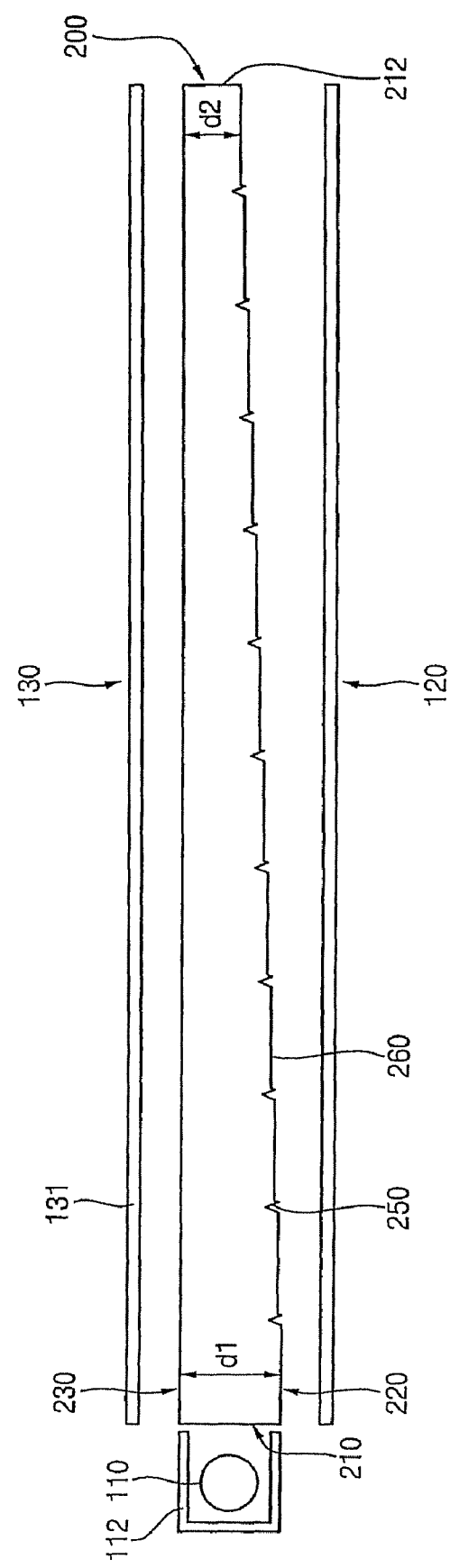
FIG. 2 is a cross-sectional view illustrating the backlight assembly of FIG. 1.

FIG. 1 is an exploded perspective view schematically illustrating a backlight assembly according to an exemplary embodiment of the present invention. FIG. 2 is a cross-sectional view illustrating the backlight assembly of FIG. 1.

Referring to FIGS. 1 and 2, a backlight assembly 100 according to an exemplary embodiment of the present invention includes a light source 110, a light-guide plate (LGP) 200, a reflective sheet 120 and at least one optical sheet 130. The light source 110 generates light. The LGP 200 guides a path of the light generated from the light source 110. The reflective sheet 120 is disposed below the LGP 200. The optical sheet 130 is disposed on the LGP 200.

The light source 110 is disposed at a first end portion of the LGP 200. The light source 110 generates the light in response to power that is provided from an external device (not shown). The light source 110 includes, for example, a hollow and cylindrical shaped cold cathode fluorescent lamp ("CCFL"). Alternatively, the light source 110 includes an external electrode fluorescent lamp ("EEFL") having two electrodes formed in two outer surfaces of an end portion of the EEFL. Alternatively, the light source 110 includes a plurality of light-emitting diodes ("LEDs").

The backlight assembly 100 may further include a light source cover 112 to protect the light source 110. The light source cover 112 may cover three adjacent sides of the light source 110 to protect the light source 110. The light source cover 112 reflects the light generated from the light source 110 toward the LGP 200 to enhance light-using efficiency.

The LGP 200 guides a path of the light generated from the light source 110. The LGP 200 includes an optically transparent material to guide the light. For example, the LGP 200 includes polymethyl methacrylate ("PMMA").

The LGP 200 includes a light-incident surface 210, a light-reflecting surface 220, a light-emitting surface 230 and a light-facing surface 212. The light generated from the light source 110 is incident into the LGP 200 through the light-incident surface 210 of the LGP 200. The light-reflecting surface 220 is extended from the base of the light-incident surface 210, and is connected to the base of the light-facing surface 212. The light-emitting surface 230 is extended substantially perpendicular to the upper side of the light-incident surface 210, and is connected to the upper edge of the light-facing surface 212. The light-facing surface 212 has a shorter length than that of the light-incident surface 210. Therefore, the LGP 200 has a wedge shape with a thickness of the LGP 200 at the light-facing surface 212 being less than a thickness of the LGP 200 at the light-incident surface 210. The thickness of the LGP 200 may therefore be decreased, as a distance from the light-incident surface 210 is increased.

A plurality of first prism patterns 250 and a flat portion 260 are formed in the light-reflecting surface 220 of the LGP 200.

The first prism patterns 250 have a stripe shape substantially parallel with the light-incident surface 210. That is, the first prism patterns 250 are formed substantially parallel with a longitudinal direction of the light source 110. In one exemplary embodiment, the first prism patterns 250 are spaced apart from each other at constant intervals. Alternatively, an interval between the first prism patterns 250 may be decreased to enhance luminance uniformity, as a distance from the light-incident surface 210 is increased.

The flat portion 260 is formed between the first prism patterns 250. The flat portion 260 is extended substantially perpendicular to the light-incident surface 210 to satisfy a total reflection condition of the LGP 200.

Thus configured, light that is incident into the LGP 200 through the light-incident surface 210 is totally reflected from the flat portion 260. A reflecting angle of the totally reflected light is changed by the first prism patterns 250, and the totally reflected light exits the LGP 200 in a vertical direction through the light-emitting section 230.

In one exemplary embodiment, the prism patterns 250 are formed in the light-reflecting section 220 through an injection molding process. In another exemplary embodiment, the prism patterns 250 may be formed in the light-reflecting section 220 through various processing methods such as a stamping method.

A plurality of second prism patterns 270 is formed in the light-emitting surface 230 of the LGP 200. The second prism patterns 270 have a stripe shape substantially perpendicular to the first prism patterns 250. That is, the second prism patterns 270, which are connected to each other, are formed substantially perpendicular to a longitudinal direction of the light source 110.

Therefore, the light that is incident through the light-incident surface 210 is condensed by the first prism patterns 250 formed on the light-reflecting surface 220 along a substantially perpendicular direction to a longitudinal direction of the light source 110. Moreover, the light that is incident through the light-incident surface 210 is condensed by the second prism patterns 270 formed on the light-emitting surface 230 along a horizontal direction to a longitudinal direction of the light source 110.

The reflective sheet 120 is disposed at the light-reflecting section 220 of the LGP 200 to reflect light that is leaked from the light-reflecting section 220 of the LGP 200 toward the LGP 200. The reflective sheet 120 includes a material having a relatively high reflectivity. For example, the reflective sheet 120 includes white polyethylene terephthalate ("PET") or white polycarbonate ("PC"). Alternatively, the reflective sheet 120 may include a metal plate such as aluminum ("Al"), which is formed on a white reflective sheet.

The optical sheet 130 is disposed on the light-emitting surface 230 of LGP 200 to enhance the luminance of the light emitted from the LGP 200 and/or to improve optical uniformity.

In the present exemplary embodiment, the optical sheet 130 includes one diffusion sheet 131 for diffusing the light exiting the LGP 200 to enhance luminance uniformity. The diffusion sheet 131 has a predetermined haze value, so that an optical problem such as a bright line, a dark line, a dark portion of a corner, etc., which is caused by the first and second prism patterns 250 and 270 of the LGP 200, may be enhanced. For example, the diffusion sheet 131 may have a haze value of about 50% to about 70%. The diffusion sheet 131, for example, may include a UTE film manufactured by MNtech Co., Ltd., South Korea. The UTE film integrates diffusion sheets and protective films into a single film.

As described above, a single diffusion sheet 131 is only used in the backlight assembly. Therefore, two prism sheets and a protection sheet may be omitted from the conventional backlight assembly, so that manufacturing costs may be reduced. Furthermore, the thickness and weight of the backlight assembly may be decreased.

Figure 3:
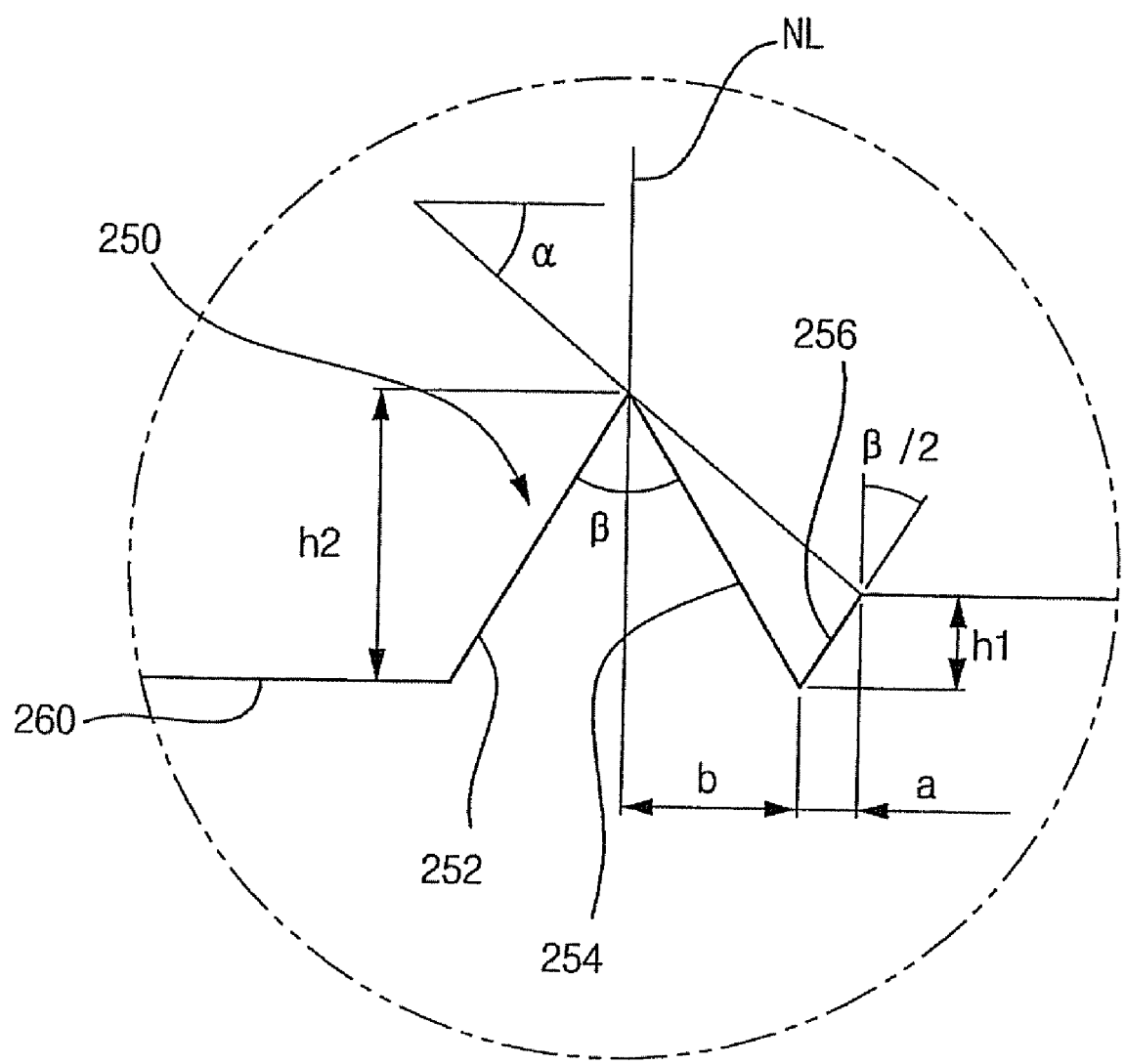
FIG. 3 is an enlarged view illustrating the first prism pattern according to an exemplary embodiment of FIG. 2.

FIG. 3 is an enlarged view illustrating the first prism pattern according to an exemplary embodiment of FIG. 2.

Referring to FIGS. 2 and 3, the first prism patterns 250 formed in the light-reflecting surface 220 of the LGP 200 includes a plurality of grooves having a substantially triangular shape so that the light that is incident into the LGP 200 exits the LGP 200 in a vertical direction.

The first prism patterns 250 include a first slanted surface 252, a second slanted surface 254 that is connected to the first slanted surface 252, and a third slanted surface 256 that is connected to the second slanted surface 254.

The first slanted surface 252 is extended from the light-reflecting surface 220 toward the light-emitting surface 230, and is inclined with respect to the light-reflecting surface 220. The second slanted surface 254 is extended from the first slanted surface 252 toward the light-reflecting surface 220, and is inclined with respect to the first slanted surface 252. The third slanted surface 256 is extended from the second slanted surface 254, and is substantially parallel with the first slanted surface 252. The third slanted surface 256 is connected to the light-reflecting surface 220.

The first and second slanted surfaces 252 and 254 are substantially symmetric with respect to a first normal line ("NL1") of the flat portion 260, which is substantially parallel with the light-emitting section 230.

The LGP 200 has a first thickness d1 at the light-incident surface 210, and has a second thickness d2 at the light-facing surface 212 that is thinner than the first thickness d1. The flat portion 260 that is disposed between the first prism patterns 250 is substantially parallel with the light-emitting surface 230. Therefore, a previous portion of each of the first prism patterns 250 has a different thickness from the following portion of each of the first prism patterns 250.

A first height h1 of the third slanted surface 256, which is substantially the same as the thickness difference between the thickness of the previous portion of each of the first prism patterns 250 and the thickness of the following portion of the first prism patterns 250, may be obtained by the following Equation 1.

$$h1 = \frac{(d1 - d2)}{m} \qquad \text{Equation 1}$$

In Equation 1, d1 and d2 represent a first thickness of the LGP 200 at the light-incident surface 210 and a second thickness of the LGP 200 at the light-facing surface 212, respectively. Moreover, m represents the number of steps of the light-reflecting surface 220.

A first height h1 of the third slanted surface 256 is therefore obtained by the thickness difference of the LGP 200 at the light-incident surface 210 and at the light-facing surface 212 and the number of steps of the light-reflecting surface 220.

Alternatively, the second height h2 of the first slanted surface 252, the first projected width "a" of the third slanted surface 256, the second projected width "b" of the second slanted surface 254, etc., are adjusted within so that the light leaking through the side surface of the LGP 200 is minimized.

The second height h2 of the first slanted surface 252 may be adjusted so that a height, having an angle of no more than the critical reflection angle "α" with respect to the first normal line NL1 of the light-incident surface 210, is not irradiated onto the third slanted surface 256. Therefore, the second height 'h2' of the first slanted surface 252 may be obtained by following Equation 2.

$$h2 = h1 \times \frac{1 + \tan(\alpha)\tan(\beta/2)}{1 - \tan(\alpha)\tan(\beta/2)} \qquad \text{Equation 2}$$

In Equation 2, "α" and "β" represent a critical angle and an interior angle between the first slanted surface 252 and a second slanted surface 254, respectively.

Moreover, a projected width "a" of the third slanted surface 256 with respect to a second normal line ("NL2") may be obtained by following Equation 3.

Equation 3

$$a = h1 \times \tan(\beta/2)$$

Moreover, a projected width "b" of the second slanted surface 254 may be obtained by following Equation 4.

Equation 4

$$b = h2 \times \tan(\beta/2)$$

Moreover, the interior angle "β" between the first slanted surface 252 and the second slanted surface 254 may be in a range of about 60° to about 90° so that the light incident into the LGP 200 may be guided in a vertical direction. For example, the interior angle "β" between the first slanted surface 252 and the second slanted surface 254 may be about 78°.

When the LGP 200 includes PMMA, the interior angle "β" may be about 42.16°. In one exemplary embodiment, a length between the light-incident surface 210 of the PMMA LGP and the light-facing surface 220 is about 213 mm, and a pitch between the first prism patterns 250 is about 300 μm, the number of steps of the light-reflecting surface 220 is 710. When the first thickness d1 of the LGP 200 at the light-incident surface 210 of the PMMA LGP is about 2.6 mm, and the second thickness d2 of the LGP 200 at the light-facing surface 220 is about 0.7 mm, a thickness difference between the first and second thicknesses d1 and d2 is about 1.9 mm. Therefore, the first height h1 of the third slanted surface 256 is about 2.68 μm according to Equation 1. When the interior angle "β" between the first slanted surface 252 and the second slanted surface 254 is about 78°, the second height h2 of the first slanted surface 252 is about 17.38 μm based on Equation 4, the projected width "a" of the third slanted surface 256 is about 2.17 μm based on Equation 5, and the projected width "b" of the second slanted surface 254 is about 14.07 μm based on Equation 4.

Figure 4:
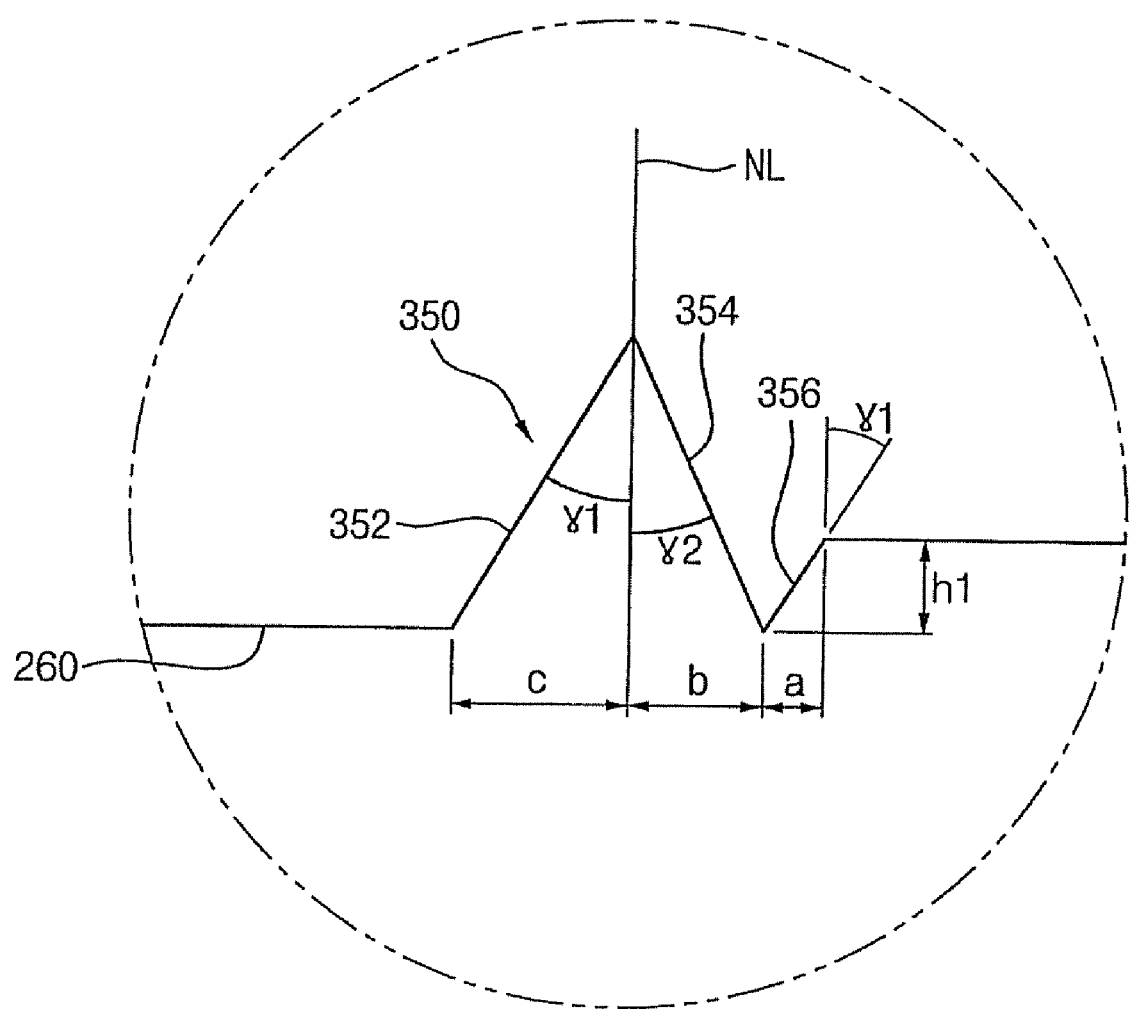
FIG. 4 is an enlarged view illustrating first prism patterns according to another exemplary embodiment of the present invention as shown in FIG. 2.

FIG. 4 is an enlarged view illustrating first prism patterns according to another exemplary embodiment of the present invention as shown in FIG. 2.

Referring to FIGS. 2 and 4, the first prism patterns 350 include a first slanted surface 352, a second slanted surface 354 that is connected to the first slanted surface 352, and a third slanted surface 356 that is connected to the second slanted surface 354. The first slanted surface 352 is inclined with respect to the light-reflecting surface 220 toward the light-emitting surface 230. The second slanted surface 354 is inclined with respect to the first slanted surface 352 toward the light-reflecting surface 220. The third slanted surface 356 is extended from the second slanted surface 354 substantially parallel with the first slanted surface 352, and is connected to the light-reflecting surface 220.

The first and second slanted surfaces 352 and 354 are substantially asymmetric with respect to a first normal line NL1 of the flat portion 260. That is, an interior angle "γ" between the first and second slanted surfaces 352 and 354 is divided into a first angle "γ1" corresponding to a projected width "c" of the first slanted surface 352, and a second angle "γ2" corresponding to a projected width "b" of the second slanted surface 354. The first angle "γ1" is different from the second angle "γ2". For example, the projected width "c" of the first slanted surface 352 is greater than the projected width "b" of the second slanted surface 354. In order to enhance luminance, the ratio of the projected width "c" to the projected width "b" is about 4:3.

The light-emitting angle of the light that exits the LGP 200 through the light-emitting surface 230 of the LGP 200 is changed by the interior angle between the first slanted surface 352 and the second slanted surface 354. Hence, a length of the projected width "c" of the first slanted surface 352 is different from a length of the projected width "b" of the second slanted surface 354, so that a first interior angle "γ1" and a second interior angle "γ2" are different from each other. The first interior angle "γ1" is an angle between the first slanted surface 352 and a first normal line NL1 of the light-emitting surface 230. The second interior angle "γ2" is an angle between the second slanted surface 354 and the first normal line NL1.

In order to enhance the distribution of the vertical light-emitting angle, the first interior angle "γ1" between the first slanted surface 352 and the first normal line NL1 of the light-emitting surface 230 may be in a range of about 34° to about 44°. In one exemplary embodiment, the first interior angle "γ1" between the first slanted surface 352 and the first normal line NL1 of the light-emitting surface 230 may be about 39°.

Figure 5:
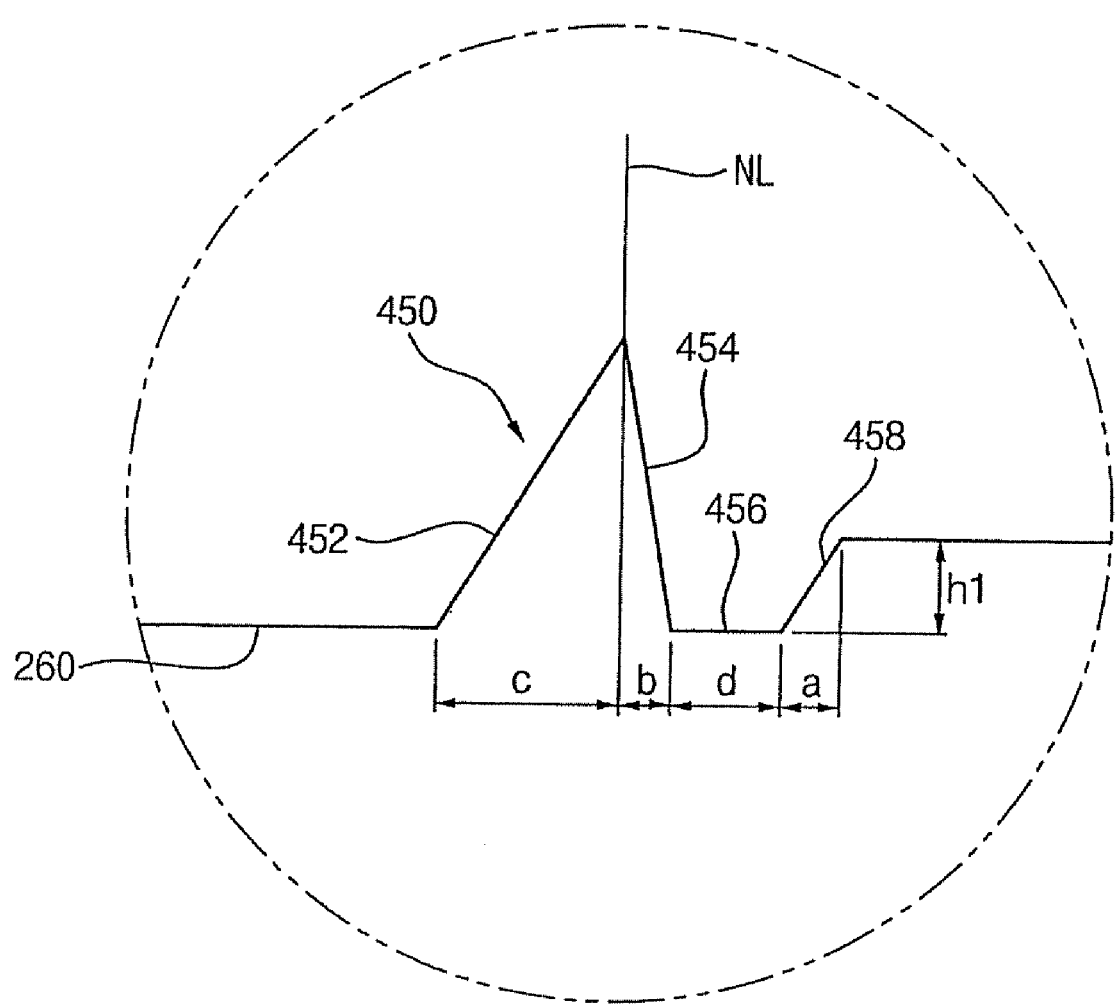
FIG. 5 is an enlarged view illustrating first prism patterns according to still another exemplary embodiment of the present invention as shown in FIG. 2.

FIG. 5 is an enlarged view illustrating first prism patterns according to still another exemplary embodiment of the present invention as shown in FIG. 2.

Referring to FIGS. 2 and 5, the first prism patterns 450 include a first slanted surface 452, a second slanted surface 454, a connection surface 456, and a third slanted surface 458. The first slanted surface 452 is extended from the light-reflecting surface 220 toward the light-emitting surface 230, and is inclined with respect to the light-reflecting surface 220. The second slanted surface 454 is extended from the first slanted surface 452 toward the light-reflecting surface 220, and is inclined with respect to the first slanted surface 452. The connection surface 456 is formed substantially parallel with the light-emitting surface 230, and between the second slanted surface 454 and the third slanted surface 458. The third slanted surface 458 is extended from the connection surface 456 substantially parallel with the first slanted surface 452 and is connected to the light-reflecting surface 220. The connection surface 456 is formed between the second slanted surface 454 and the third slanted surface 458, so that the connection surface 456 enhances transferability in an injection molding process of the first prism patterns 450.

The first and second slanted surfaces 452 and 454 are substantially asymmetric with respect to the first normal line NL1 of the light-emitting surface 230. The projected width "c" of the first slanted surface 452 may be greater than the projected width 'b' of the second slanted surface 454. Particularly, in order to enhance luminance, the ratio of the projected width "c" of the first slanted surface 452 to the projected width "b" of the second slanted surface 454 may be about 4:1. Here, a width "d" of a connection surface 456 may be about ¾ of the lower projected width "c" of the first slanted surface 452.

Figure 6:
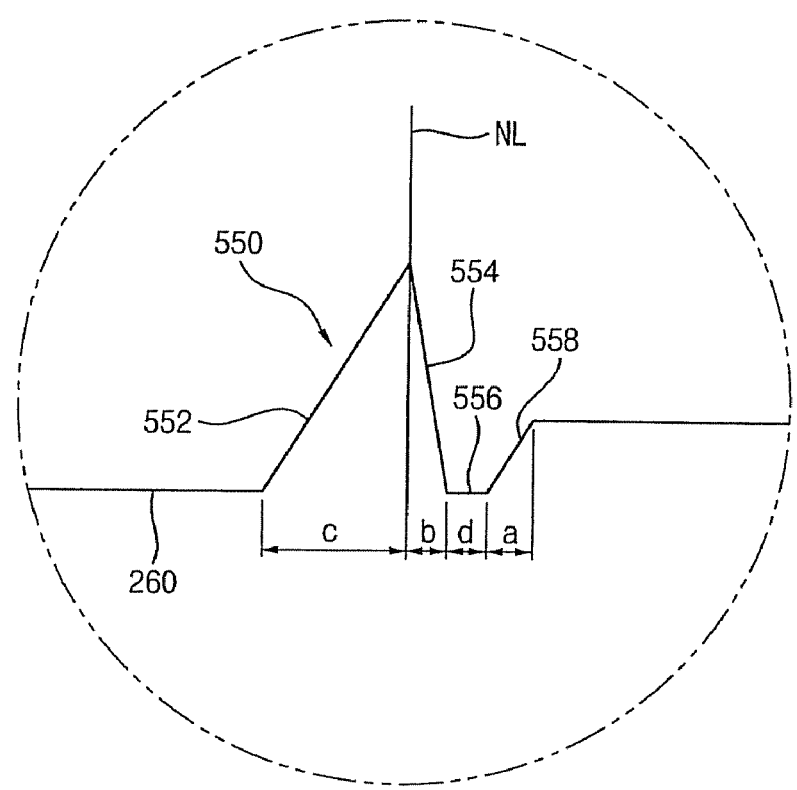
FIG. 6 is an enlarged cross-sectional view illustrating first prism patterns according to still another exemplary embodiment of the present invention as shown in FIG. 2.

FIG. 6 is an enlarged cross-sectional view illustrating first prism patterns according to further still another exemplary embodiment of the present invention as shown in FIG. 2.

Referring to FIGS. 2 and 6, the first prism patterns 550 include a first slanted surface 552, a second slanted surface 554, a connection surface 556, and a third slanted surface 558. The first slanted surface 552 is extended from the light-reflecting surface 220 toward the light-emitting surface 230, and is inclined with respect to the light-reflecting surface 220. The second slanted surface 554 is extended from the first slanted surface 552 toward the light-reflecting surface 220, and is inclined with respect to the first slanted surface 552. The connection surface 556 is formed substantially parallel with the light-emitting surface 230, and between the second slanted surface 554 and the third slanted surface 558. The third slanted surface 558 extended from the connection surface 556, which is substantially parallel with the first slanted surface 552, is connected to the light-reflecting surface 220.

The first slanted surface 552 and the second slanted surface 554 are substantially asymmetric with respect to the first normal line NL1 of the light-emitting surface 230. The projected width 'c' of the first slanted surface 552 is greater than the projected width 'b' of the second slanted surface 554. Particularly, in order to enhance luminance, the ratio of the projected width "c" of the first slanted surface 552 to the projected width "b" of the second slanted surface 554 may be about 4:1.

In order to prevent light from leaking through the third slanted surface 558, the connection surface 556 may have a small width. However, the connection surface 556 is wide enough not to deteriorate the transferability of the first prism patterns 550. For example, a width "d" of the connection surface 556 may be about ¼ of the projected width "c" of the first slanted surface 552.

Figure 7:
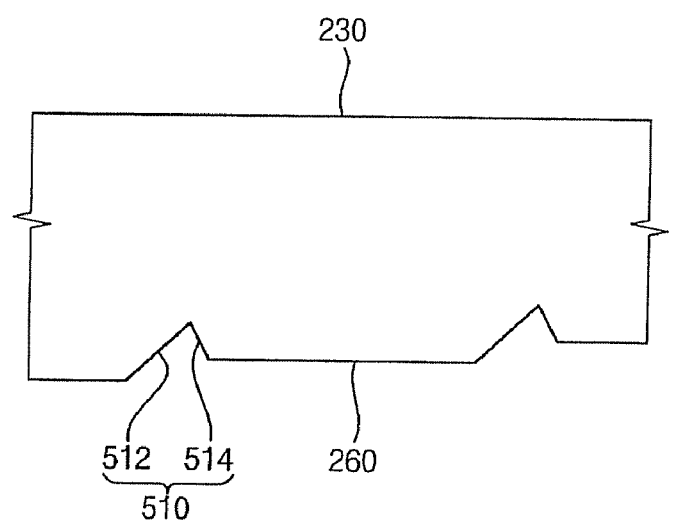
FIG. 7 is an enlarged view illustrating first prism patterns according to further still another exemplary embodiment of the present invention.

FIG. 7 is an enlarged view illustrating first prism patterns according to further still another exemplary embodiment of the present invention.

Referring to FIGS. 2 and 7, a plurality of first prism patterns 510 and a plurality of flat portions 260 are formed on a light-reflecting surface 220 of the LGP 200. The first prism patterns 510 are spaced apart from each other. The flat portions 260 are formed adjacent to the first prism patterns 510. A distance between the flat portions 260 and the light-incident surface 230 is decreased, as a distance from the light-incident surface 210 is increased. The flat portions 260 are formed perpendicular to the light-incident surface in FIG. 210. That is, the flat portions 260 are formed parallel to the light-incident surface 230.

Each of the first prism patterns 510 includes a first slanted surface 512 and a second slanted surface 514. The first slanted surface 512 is slantly extended from the first flat portion 260 of the light-reflecting surface 220 toward the light-emitting surface 230. The first slanted surface 512 is inclined with respect to the first flat portion 260. The second slanted surface 514 is extended from the first slanted surface 512 toward the light-reflecting surface 220. The second slanted surface 514 is inclined with respect to the first slanted surface 512.

In order to enhance the distribution of the vertical light-emitting angle, an interior angle between the first slanted surface 512 and a normal line of the light-emitting surface 230 may be about 35° to about 50°. In one exemplary embodiment, when a prism sheet is used as the optical sheet 130, the interior angle between the first slanted surface 512 and the normal line of the light-emitting surface 230 may be about 40°. In one exemplary embodiment, when a reflective-polarization sheet is used as the optical sheet 130, the interior angle between the first slanted surface 512 and the normal line of the light-emitting surface 230 may be about 44°. Therefore, the interior angle between the first slanted surface 512 and the normal line of the light-emitting surface 230 may be about 40° to about 44°.

The size of the first prism patterns 510 corresponding to the height of the first slanted surface 512 may be about 2 μm to about 50 μm. The size of the first prism patterns 510 may be varied according to a position thereof. In one exemplary embodiment, the size of the first prism patterns 510 may be set by a higher-order polynomial function from the light-incident surface 210 to the light-facing surface 212. As a variable function for the size of the first prism patterns 510 is increased from a first order to a higher order, the luminance of a central portion is higher, and the luminance of an adjacent portion of the light-incident surface 210 and the light-facing surface 212 is lower. In one exemplary embodiment, the variable function for the size of the first prism patterns 510 may be set so that a luminance distribution has a Gaussian profile. Furthermore, a distance between the first prism patterns 510 may be set to be about 100 μm to about 300 μm.

As described above, the first prism patterns 510 are formed to have the first slanted surface 512 and the second slanted surface 514, so that a forming process and an injection molding process of the first prism patterns 510 may be enhanced in comparison with the first prism pattern 250 having the third slanted surface as shown in FIGS. 3 to 6.

Figure 8:
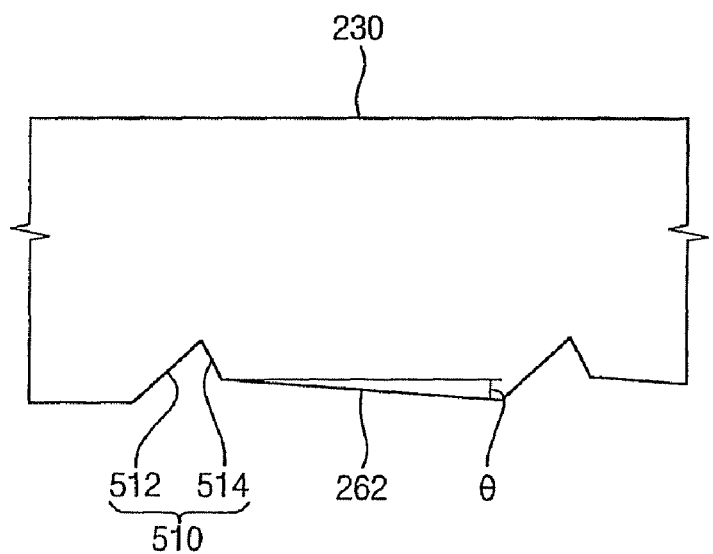
FIG. 8 is an enlarged view illustrating a flat portion according to further still another exemplary embodiment of the present invention.

FIG. 8 is an enlarged view illustrating a flat portion according to further still another exemplary embodiment of the present invention.

Referring to FIGS. 2 and 8, each of the flat portions 262 formed between the first prism patterns 510 is slantly formed to have a predetermined angle "θ" toward a lower direction with respect to the light-emitting surface 230 of the LGP 200, as a distance from the light-incident surface 210 is increased. For example, the flat portion 262 may be formed to be slanted by about 0.1° to about 0.3°.

As described above, when the flat portion 262 is slantly formed toward the lower direction of the LGP 200, an incident angle of light that is incident from the light-incident surface 210 to the flat portion 262 is increased. Therefore, a reflecting angle is increased, thereby increasing a total reflectivity. Furthermore, a light range is increased, so that the number of reflections is decreased. Therefore, light leakage is minimized, so that effective light emitted through the light-incident surface 230 is increased and luminance may be enhanced.

Figure 9:
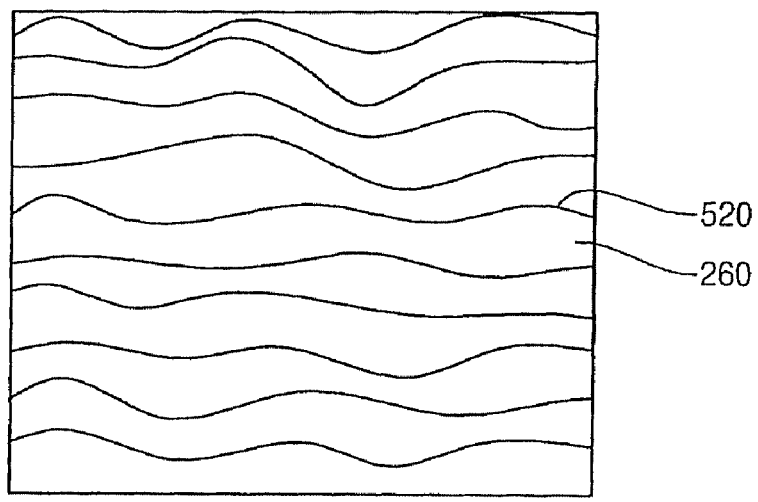
FIG. 9 is a plan view illustrating first prism patterns according to further still another exemplary embodiment of the present invention.

FIG. 9 is a plan view illustrating first prism patterns according to further still another exemplary embodiment of the present invention.

Referring to FIG. 9, the first prism patterns 520 may include an irregular curved shape when viewed from a plan view of the light-reflecting surface 220 of the LGP 200. When the first prism pattern 520 has the irregular curved shape, a display defect such as a moiré pattern may be prevented, which is generated by interference between the LGP 200 and a display panel that is disposed on the LGP 200. Alternatively, the first prism patterns 520 may include an irregular oblique line shape when viewed from a plan view of the light-reflecting surface 220 of the LGP 200 in order to prevent the moiré pattern.

FIGS. 10A to 10G are enlarged views illustrating first prism patterns according to further still another exemplary embodiment of the present invention.

Referring to FIGS. 10A to 10G, a first prism pattern 800 includes n inverted prism portions 810. Here, n is a natural number greater than two. That is, the first prism patterns 900 include at least two of the inverted prism portions 810.

Each of the inverted-prism portions 810 includes a first slanted surface 812 and a second slanted surface 814. The first slanted surface 812 is slantly extended from a previous flat portion 260 of the light-reflecting surface 220 or a previous inverted prism portion 810 toward the light-emitting surface 230. The first slanted surface 812 is inclined with respect to the first flat portion 260. The second slanted surface 814 is extended from the first slanted surface 812 toward the light-reflecting surface 220 to be connected to a following flat portion 260 or a following inverted prism portion 810. The second slanted surface 814 is inclined with respect to the first slanted surface 812.

Figure 10A:
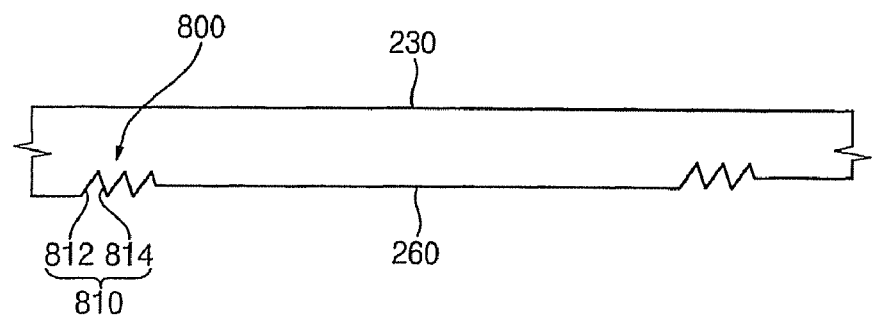
FIGS. 10A to 10G are enlarged views illustrating first prism patterns according to further still another exemplary embodiment of the present invention.
Figure 10B:
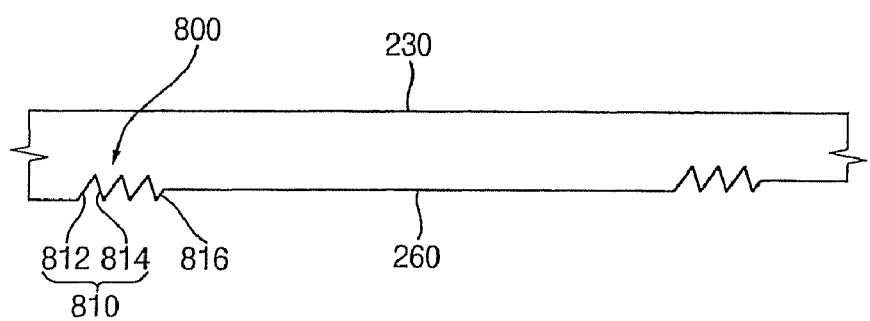

Referring to FIG. 10B, the first prism pattern 800 may further include a third slanted surface 816. The third slanted surface 816 is slantly extended from a lower portion of the second slanted surface 812 of the last one of the inverted prism portions 810 (e.g., an n-th inverted prism portion 810) toward the light-emitting surface 230 to be connected to the following flat portion 260.

Figure 10C:
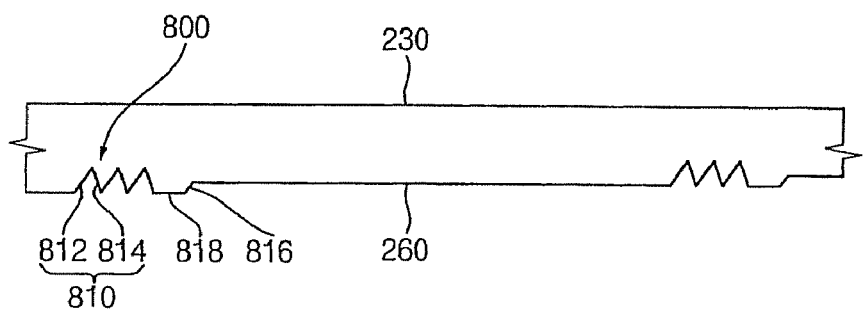

Referring to FIG. 10C, the first prism pattern 800 may further include a sub-flat portion 818. The sub-flat portion 818 is formed from the flat portion 818, so that the sub-flat portion 818 is parallel to the light-emitting surface 230. The sub-flat portion 818 is formed between the n-th inverted prism portion 810 and the third slanted surface 816.

Figure 10D:
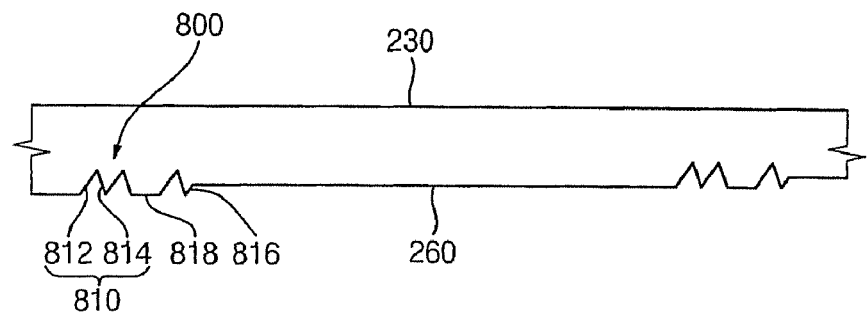
Figure 10E:
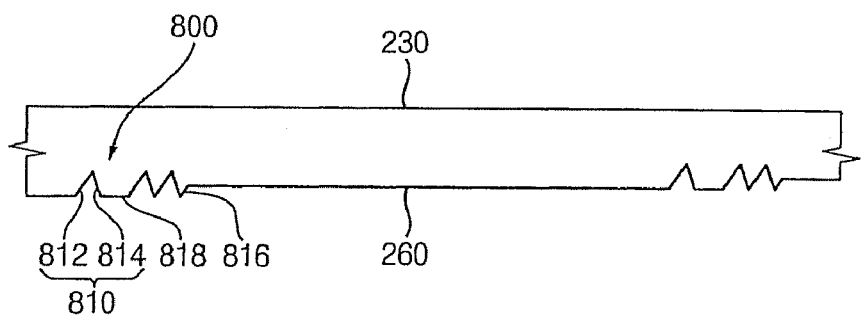
Figure 10F:
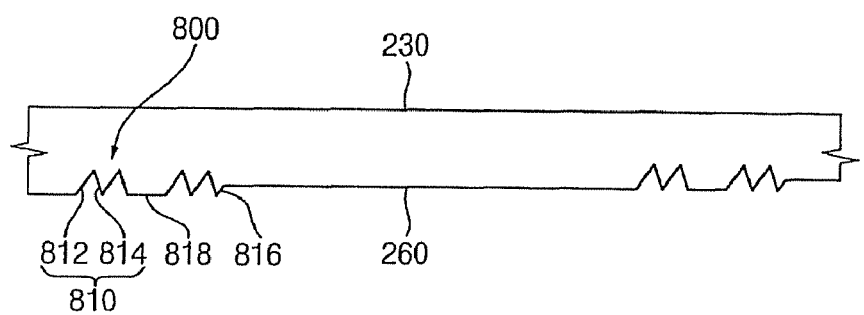

Referring to FIGS. 10D to 10F, a sub-flat portion 818 may be formed between the inverted prism portions 810.

In one exemplary embodiment, the sub-flat portion 818 may be formed between the inverted prism portions 810 and the last inverted prism portion 810 (e.g., n-th inverted prism portion 810), as shown in FIG. 10D. In one exemplary embodiment, the sub-flat portion 818 may be formed between the first inverted prism portions 810 and the last inverted prism portion 810, as shown in FIG. 10E. In one exemplary embodiment, the sub-flat portion 818 may be formed between the inverted prism portions 810 adjacent to each other, as shown in FIG. 10D.

Figure 10G:
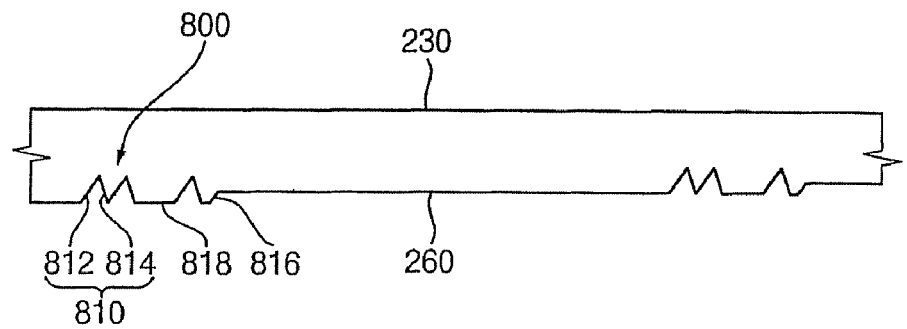

Referring to FIG. 10G, the first prism pattern 800 may include two or more sub-flat portions 818. For example, the sub-flat portion 818 may be formed between the inverted prism portions 810 adjacent to each other, and between the n-numbered inverted prism portion 810 and the third slanted surface 816, respectively.

In FIGS. 10A to 10G, the flat portions 260 are formed perpendicular to the light-incident surface 210, so that the flat portions 260 are parallel to the light-emitting surface 230. Alternatively, the flat portions 260 may be formed to be slanted by about 0.1° to about 0.3° toward the light-reflecting surface 220 with respect to the light-emitting surface 230 of the LGP 200, as a distance from the light-incident surface 210 is increased. Furthermore, the first prism patterns 800 may have a strip shape that is parallel to the light-incident surface 210 when viewed from a plan view of the light-reflecting surface 220. Alternatively, the first prism patterns 800 may have an irregular curved shape when viewed from a plan view of the light-reflecting surface 220.

As described above, at least two prism portions 810 are formed in one first prism pattern 800, so that light leakage may be decreased and a light emission angle distribution may be concentrated so that front luminance may be enhanced.

Figure 11:
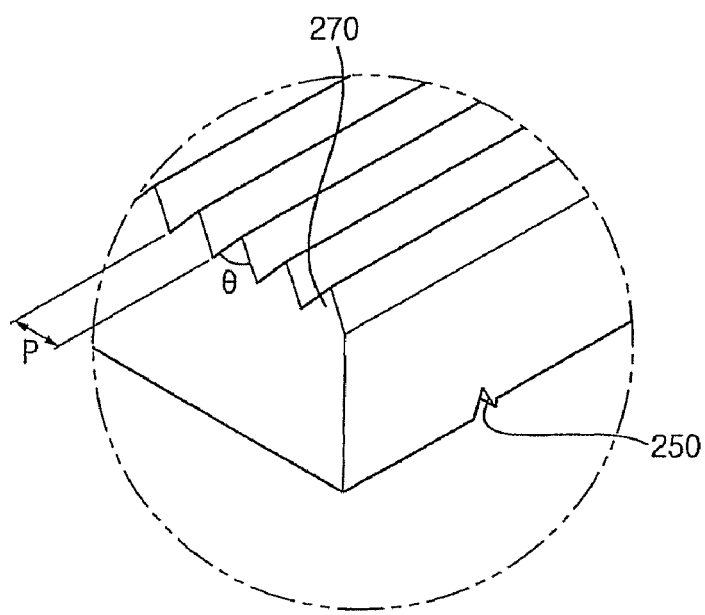
FIG. 11 is a partially enlarged view illustrating the LGP of FIG. 1.

FIG. 11 is a partially enlarged view illustrating the LGP 200 of FIG. 1.

Referring to FIG. 11, a plurality of second prism patterns 270 is formed in the light-emitting surface 230 of the LGP 200. The second prism patterns 270, which are connected to each other, are formed over the entire surface of the light-emitting surface 230.

The second prism patterns 270 are formed substantially perpendicular to a longitudinal direction of the light source 110. Therefore, the first prism patterns 250 and the second prism patterns 270 are substantially perpendicular to each other.

In one exemplary embodiment, the second prism patterns 270 include a substantially triangular cross-section. The interior angle θ of each of the second prism patterns 270 may be about 80° to about 150°. In one exemplary embodiment, the interior angle θ may be about 110°. A pitch P between the second prism patterns 270 may be in a range of about 50 μm to about 150 μm.

Alternatively, an upper portion of each of the second prism patterns 270 may include a substantially winding shape. An end portion between two slanted surfaces of each of the second prism patterns 270 may have the substantially winding shape. Alternatively, the second prism patterns 270 may include a substantially curved surface shape when viewing the cross-sectional view of the LGP 200.

Figure 12A:
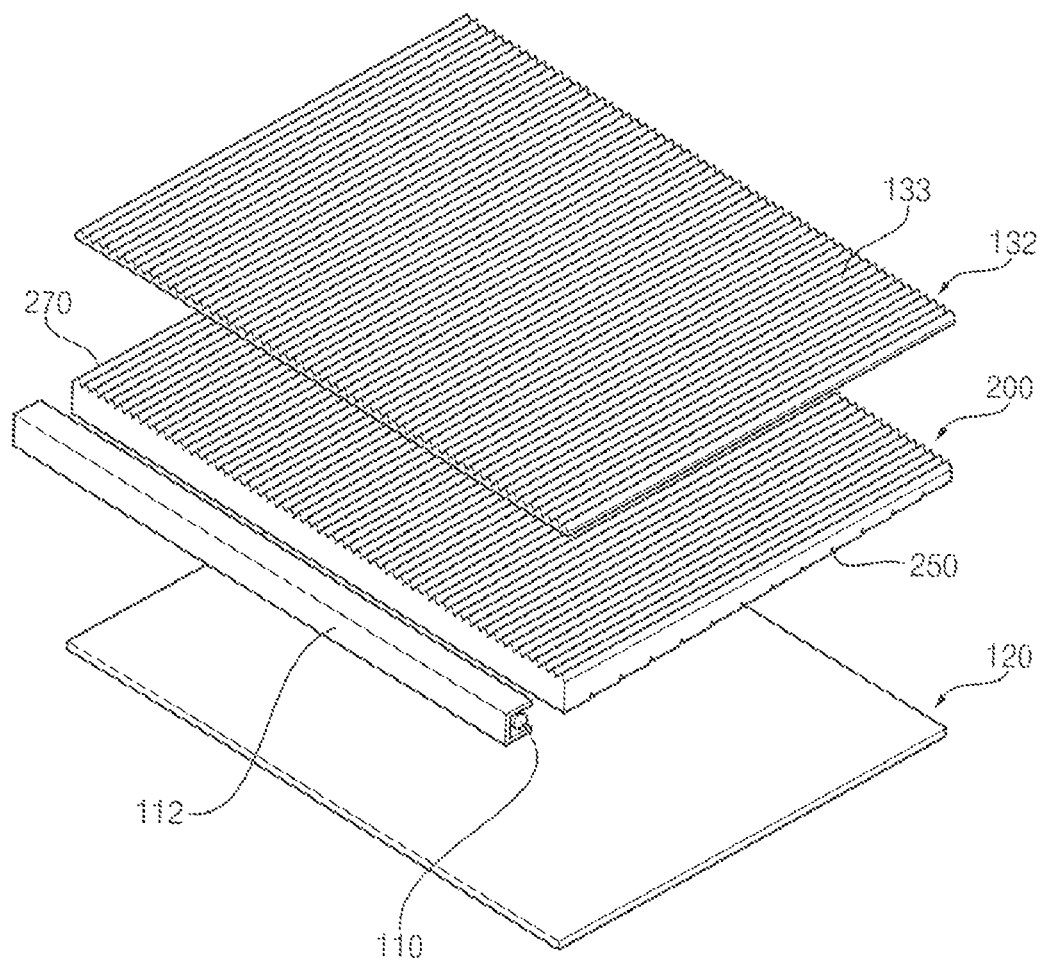
FIGS. 12A and 12B are exploded perspective views schematically illustrating a respective backlight assembly according to other exemplary embodiments of the present invention.
Figure 12B:
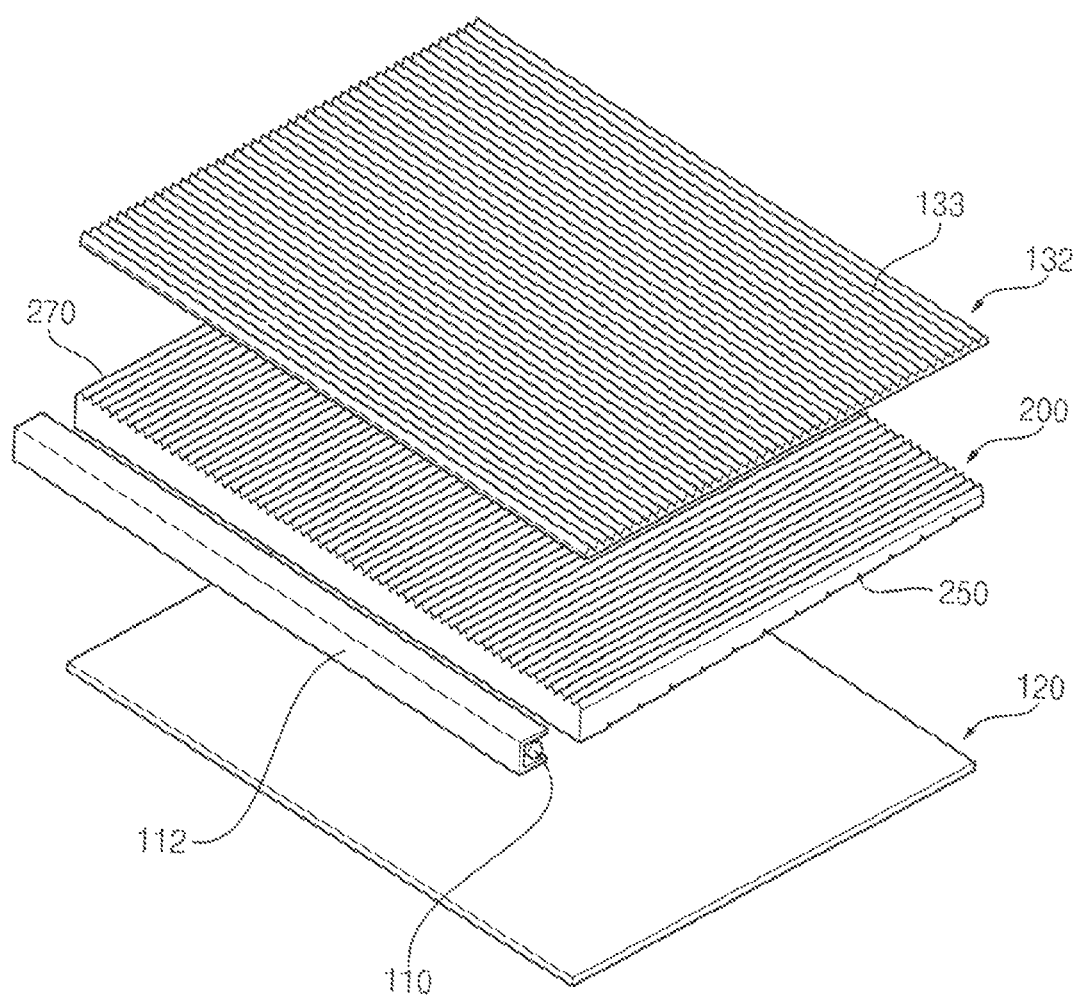

FIG. 12 is an exploded perspective view schematically illustrating a backlight assembly according to another exemplary embodiment of the present invention. In FIG. 12, the backlight assembly of the present embodiment is the same as in FIG. 1 except for an optical sheet. Thus, the same reference numerals will be used to refer to the same or like parts as those described in FIG. 1 and any further explanation concerning the above elements will be omitted.

Referring to FIG. 11, an optical sheet includes a single prism sheet 132. A plurality of third prism patterns 133, which are connected to each other, is formed over an upper surface of the prism sheet 132. In one exemplary embodiment, the third prism patterns 133 may include a stripe shape substantially parallel with the second prism patterns 270. Alternatively, the third prism patterns 133 may include a stripe shape substantially perpendicular to the second prism patterns 270. In another exemplary embodiment, the prism sheet 132 may include a Vikuiti™ Brightness Enhancement III (BEF III) film manufactured by 3M Inc., U.S.A. Alternatively, a lower surface of the prism sheet 132 may be matted.

The third prism patterns 133 include a substantially triangular shape. A vertical angle of the third prism patterns 133 may be in a range of about 80 degrees to about 150 degrees. In one exemplary embodiment, a vertical angle of the third prism patterns 133 may be in a range of about 110 degrees. An upper portion of each of the third prism patterns 133 may include a substantially winding shape. An end portion between the two slanted surfaces of each of the third prism patterns 133 may have the substantially winding shape. Alternatively, the third prism patterns 133 may have a substantially curved surface shape when viewing the cross-sectional view of the LGP 200.

As described above, a single prism sheet 132 may be used in the backlight assembly, so that an optical problem such as a bright line, a dark line, a dark portion of a corner, etc. may be enhanced. Furthermore, luminance may be enhanced as compared to backlight assemblies in which only a diffusion sheet is used.

Figure 13:
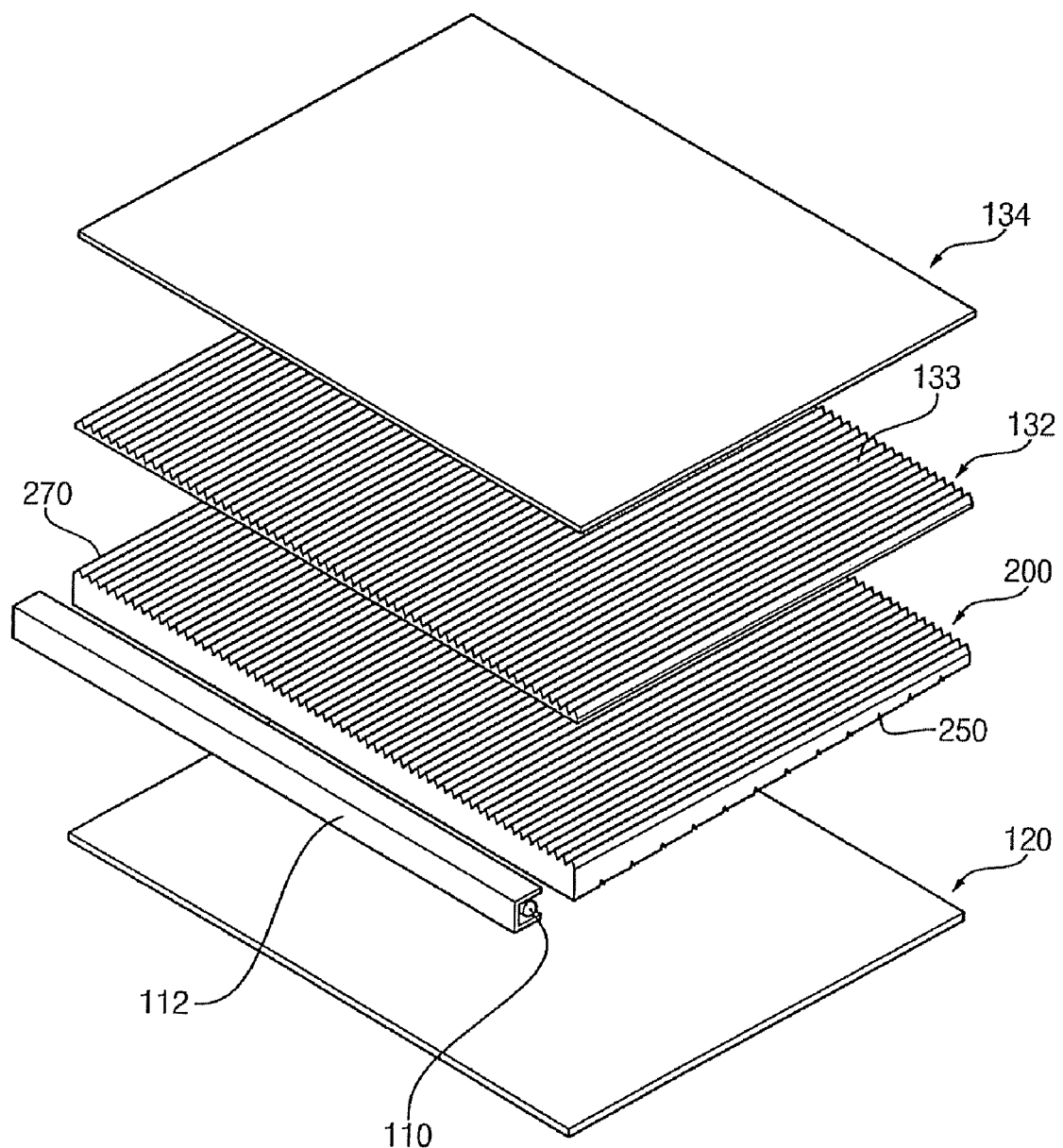
FIG. 13 is an exploded perspective view schematically illustrating a backlight assembly according to still another exemplary embodiment of the present invention.

FIG. 13 is an exploded perspective view schematically illustrating a backlight assembly according to still another exemplary embodiment of the present invention. In FIG. 13, the backlight assembly of the present embodiment is the same as in FIG. 8 except for a protection sheet. Thus, the same reference numerals will be used to refer to the same or like parts as those described in FIG. 12 and any further explanation concerning the above elements will be omitted.

Referring to FIG. 13, an optical sheet includes a single prism sheet 132 and a single protection sheet 134. The protection sheet 134 may be disposed on the prism sheet 132 to protect the prism sheet 132, so that a close adhesion between the prism sheet 132 and an LCD panel may be prevented. Therefore, the reliability of an optical quality may be further enhanced. In one exemplary embodiment, the protection sheet 134 may have a haze value of about 70% to about 90%.

Table 1 below shows data that correspond to optical characteristics of LCD device according to various combinations of optical sheets. In Table 1, a backlight assembly according to the Comparative Example includes a first LGP not having the first and second prism patterns formed thereon, one diffusion sheet disposed on the first LGP, two prism sheets disposed on the diffusion sheet and a protection sheet disposed on the prism sheet. A backlight assembly according to the Exemplary Embodiment 1 includes a second LGP having the first and second prism patterns formed thereon and one diffusion sheet disposed on the second LGP, as shown in FIG. 1. A backlight assembly according to the Exemplary Embodiment 2 includes a third LGP having the first and second prism patterns formed thereon and one prism sheet disposed on the third LGP, as shown in FIG. 12. A backlight assembly according to the Exemplary Embodiment 2 includes a fourth LGP having the first and second prism patterns formed thereon and prism and protection sheets that are disposed on the fourth LGP, as shown in FIG. 13.

TABLE 1

|  | Comparative Example | Exemplary Embodiment 1 | Exemplary Embodiment 2 | Exemplary Embodiment 3 |
| --- | --- | --- | --- | --- |
| Luminance (5 points) | 176 nit | 166 nit | 216 nit | 215 nit |
| Luminance ratio | 100.0% | 94.2% | 123.1% | 122.2% |
| Luminance uniformity | 92.2% | 93.2% | 86.8% | 86.9% |

As shown in Table 1, an average luminance of the Exemplary Embodiment 1 employing a single diffusion sheet is lower than that of the Comparative Example employing four optical sheets, however three optical sheets may be omitted such that manufacturing costs of the backlight assembly may be reduced, and the thickness and weight of the backlight assembly may be decreased.

In a case of the Exemplary Embodiment 2 employing a single prism sheet or the Exemplary Embodiment 3 employing a single prism sheet and a single protection sheet, a luminance uniformity of each of the Exemplary Embodiments 2 and 3 is lower than that of the Comparative Example or the Exemplary Embodiment 1. However, luminance of each of the Exemplary Embodiments 2 and 3 is increased about 23% in comparison with the Comparative Example, and luminance of each of the Exemplary Embodiments 2 and 3 is increased about 30% in comparison with the Exemplary Embodiment 1. Therefore, according to the Exemplary Embodiments 2 and 3, an average luminance may be increased in comparison with the Comparative Example. Furthermore, an optical sheet may be decreased, so that the weight and manufacturing costs of the backlight assembly may be decreased.

Figure 14:
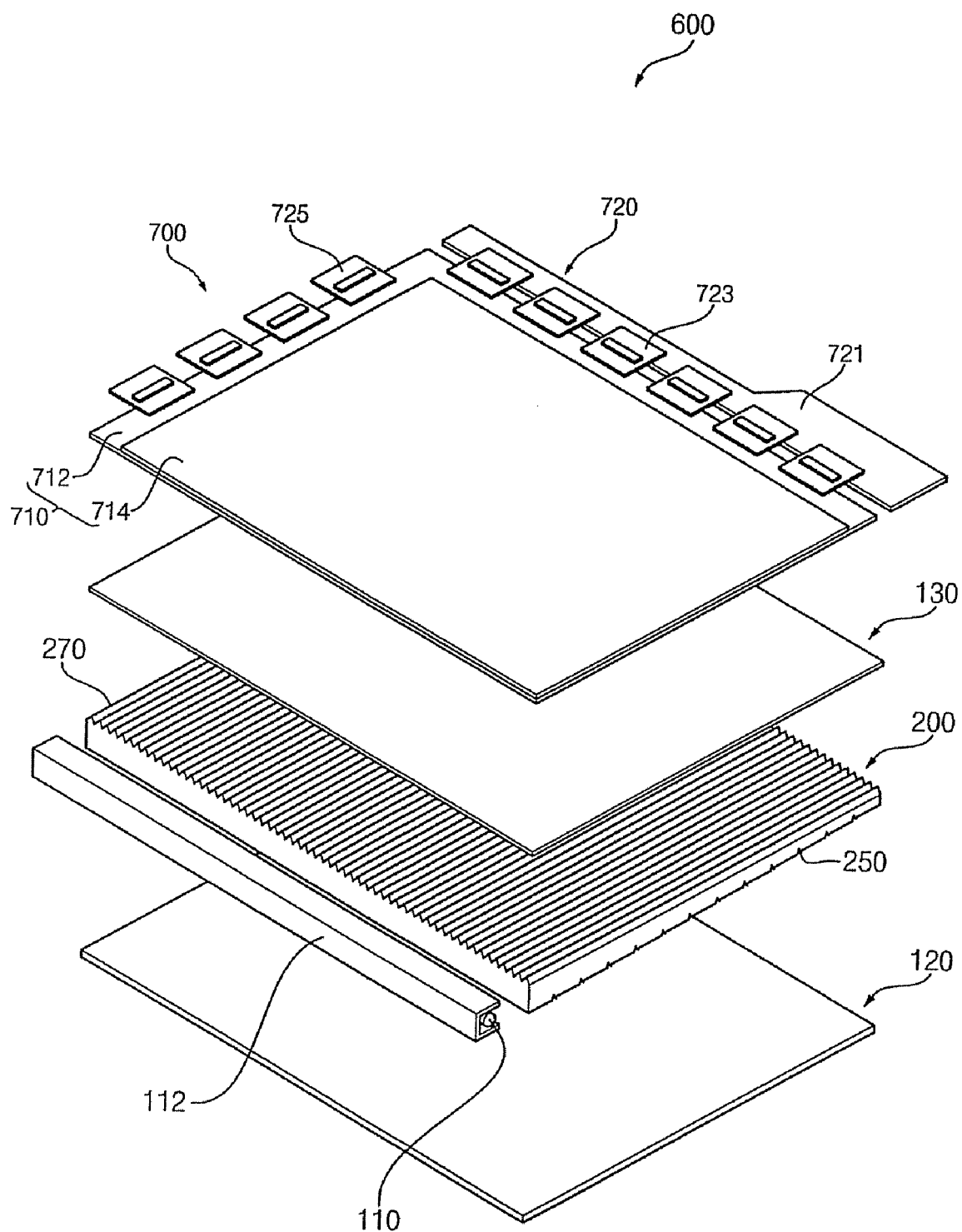
FIG. 14 is an exploded perspective view schematically illustrating an LCD device according to an exemplary embodiment of the present invention.

FIG. 14 is an exploded perspective view illustrating an LCD device according to an exemplary embodiment of the present invention.

Referring to FIG. 14, an LCD device 600 according to an exemplary embodiment of the present invention includes a backlight assembly 100 generating light and a display assembly 700 displaying an image using the light exiting the backlight assembly 100.

The backlight assembly 100 includes a light source 110 generating light, an LGP 200 guiding a path of the light that is generated from the light source 110, a reflective sheet 120 that is disposed below the LGP 200 and at least one optical sheet 130 that is disposed on the LGP 200. The backlight assembly 100 may have various types such as shown in FIGS. 1 to 13. Therefore, detailed descriptions of the identical elements are omitted.

The display assembly 700 includes an LCD panel 710 that displays an image using the light provided from the backlight assembly 100 and a driver circuit section 720 for driving the LCD panel 710.

The LCD panel 710 may be disposed on the optical sheet 130. The LCD panel 710 includes a first substrate 712, a second substrate 714 facing the first substrate 712 and a liquid crystal layer (not shown) may be disposed between the first substrate 712 and the second substrate 714.

The first substrate 712 may be a thin-film transistor ("TFT") substrate on which a plurality of TFTs is formed in a matrix shape. In one exemplary embodiment, the first substrate 712 includes glass. Each of the TFTs includes a source electrode electrically connected to the data line, a gate electrode electrically connected to a gate line and a drain electrode electrically connected to a pixel electrode (not shown) that includes a transparent and conductive material.

The second substrate 714 may be a color filter substrate on which red (R), green (G) and blue (B) pixels (not shown) are formed as a thin-film shape. The second substrate 714 includes glass. The second substrate 714 also includes a common electrode (not shown) formed thereon. The common electrode also includes the transparent conductive material. Alternatively, the color filters may be formed on the first substrate.

When power is applied to the gate electrode of the TFT, the TFT is turned on so that an electric field is generated between the pixel electrode and the common electrode. The electric field varies an aligning angle of the liquid crystal molecules interposed between the first substrate 712 and the second substrate 714. Thus, light transmittance of the liquid crystal layer is changed in accordance with the variation of the aligning angle of the liquid crystal molecules to display a desired image.

The driver circuit section 720 may include a source printed circuit board ("PCB") 721, a data driver circuit film 723 and a gate driver circuit film 725. The source PCB 721 provides the LCD panel 710 with various control signals for driving the LCD panel 710. The data driver circuit film 723 electrically connects the source PCB 721 to the LCD panel 710. The gate driver circuit film 725 may be electrically connected to the LCD panel 710 to provide the LCD panel 710 with a gate drive signal.

The data driver circuit film 723 may be electrically connected to a data line of the first substrate 712, and the gate driver circuit film 725 may be electrically connected to a gate line of the first substrate 712. The data driver circuit film 723 and the gate driver circuit film 725 may include a plurality of driver chips that output a driving signal for driving the LCD panel 710 in response to a control signal provided from the source PCB 721. The drive chips may include a data driver chip mounted on the data driver circuit film 723 and a gate driver chip mounted on the gate driver circuit film 725. Each of the data and gate driver circuit films 723 and 725 include, for example, a tape carrier package ("TCP") or a chip-on-film ("COF").

Alternatively, the driver circuit section 720 may further include a gate PCB that is electrically connected to the gate driver circuit film 725.

According to the backlight assembly and the LCD device having the backlight assembly, a single diffusion sheet is disposed on the LGP having prism patterns that are formed on a lower surface and upper surface of the LGP, so that manufacturing costs may be reduced and the thickness and weight of the backlight assembly may be decreased without decreasing efficiency.

Moreover, a single prism sheet is disposed on the LGP having prism patterns that are formed on a lower surface and upper surface of the LGP, or a single prism sheet and a single protection sheet are disposed on the LGP, so that luminance may be enhanced and the number of optical sheets may be decreased. Therefore, the thickness and weight of the backlight assembly may be decreased.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a light source emitting light;
a light-guide plate (LGP) including a light-incident surface, a light-reflecting surface and a light-emitting surface, the light-incident surface receiving light from the light source, the light-reflecting surface having a plurality of first prism patterns spaced apart from each other and a plurality of flat portions each of which is formed between the first prism patterns, the flat portions being substantially perpendicular to the light-incident surface, and the light-emitting surface having a plurality of second prism patterns formed thereon;
a reflective sheet disposed below the LGP; and
at least one optical sheet disposed on the LGP,
wherein the first prism patterns comprise:
a first slanted surface being extended from a first flat portion of the light-reflecting surface toward the light-emitting surface;
a second slanted surface being extended from the first slanted surface toward the light-reflecting surface; and
a third slanted surface being extended from the second slanted surface and being connected to a second flat portion.

2. The backlight assembly of claim 1, the LGP further comprising a light-facing surface disposed opposite the light-incident surface wherein the LGP has a thickness stepwise decreasing from the light-incident surface to the light-facing surface.

3. The backlight assembly of claim 2, wherein the first prism patterns have a stripe shape substantially parallel with the light-incident surface.

4. The backlight assembly of claim 2, wherein the first prism patterns have an irregular curved shape when viewed from a plan view of the light-reflecting surface.

5. The backlight assembly of claim 1,
wherein the first slanted surface and third slanted surface are substantially parallel with each other.

6. The backlight assembly of claim 5, wherein the second prism patterns have a stripe shape substantially perpendicular to the first prism patterns.

7. The backlight assembly of claim 6, wherein an interior angle of each of the second prism patterns is in a range of about 80° to about 150°.

8. The backlight assembly of claim 6, wherein the optical sheet comprises a diffusion sheet.

9. The backlight assembly of claim 5, wherein the first and second slanted surfaces are substantially symmetric with respect to a normal line of the first flat portion.

10. The backlight assembly of claim 5, wherein the first and second slanted surfaces are substantially asymmetric with respect to a normal line of the first flat portion.

11. The backlight assembly of claim 10, wherein a projected width of the first slanted surface is greater than a projected width of the second slanted surface.

12. The backlight assembly of claim 6, wherein the optical sheet comprises a prism sheet having third prism patterns formed thereon, wherein the third prism patterns are connected to each other.

13. The backlight assembly of claim 12, wherein the third prism patterns have a stripe shape substantially parallel with the second prism patterns.

14. The backlight assembly of claim 12, wherein the third prism patterns have a stripe shape substantially perpendicular to the second prism patterns.

15. The backlight assembly of claim 12, wherein an interior angle of each of the third prism patterns is in a range of about 80° to about 150°.

16. The backlight assembly of claim 12, wherein a lower surface of the prism sheet is matted.

17. The backlight assembly of claim 12, wherein the optical sheet further comprises a protection sheet disposed on the prism sheet.

18. The backlight assembly of claim 1, wherein the second prism patterns are connected to each other.

19. The backlight assembly of claim 1, wherein the first prism patterns are spaced apart from each other at constant intervals.

20. The backlight assembly of claim 1, wherein an interval between the first prism patterns is decreased, as a distance from the light-incident surface is increased.

21. A liquid crystal display (LCD) device comprising:
   a light source emitting light;
   a light-guiding plate (LGP) including a light-incident surface receiving light from the light source, a light-reflecting surface having a plurality of first prism patterns spaced apart from each other and a plurality of flat portions each of which is formed between the first prism patterns, the flat portions being substantially perpendicular to the light-incident surface, and a light-emitting surface having a plurality of second prism patterns formed thereon;
   a reflective sheet disposed below the LGP;
   at least one optical sheet disposed on the LGP; and
   an LCD panel disposed on the optical sheet to display an image,
   wherein the first prism patterns comprise:
      a first slanted surface being extended from a first flat portion of the light-reflecting surface toward the light-emitting surface;
      a second slanted surface being extended from the first slanted surface toward the light-reflecting surface; and
      a third slanted surface being extended from the second slanted surface and being connected to a second flat portion.

22. The LCD device of claim 21, wherein the optical sheet comprises a prism sheet.

23. The LCD device of claim 22, wherein the optical sheet further comprises a protection sheet disposed on the prism sheet.

24. The LCD device of claim 21, wherein the optical sheet comprises a diffusion sheet.

25. A method of manufacturing a backlight assembly, the backlight assembly including a light source emitting light, a. light guide plate (LGP), a reflection sheet disposed below the LGP, and at least one optical member disposed on the LGP, the method comprising:
   forming a plurality of first prism patterns on a light-reflecting surface of the LGP;
   forming a plurality of flat portions between the prism patterns, the flat portions substantially perpendicular to a light-incident surface of the LGP; and
   forming a plurality of second prism patterns on a light-emitting surface of the LGP;
   wherein the light-incident surface receives light emitted from the light source,
   wherein the first prism patterns comprise:
      a first slanted surface being extended from a first flat portion of the light-reflecting surface toward the light-emitting surface;
      a second slanted surface being extended from the first slanted surface toward the light-reflecting surface; and
      a third slanted surface being extended from the second slanted surface and being connected to a second flat portion.

26. The method of claim 25, wherein the LGP has a thickness stepwise decreasing from the light-incident surface to the light-facing surface; wherein further, the light-facing surface is disposed opposite the light-incident surface.

27. The method of claim 26, wherein the first prism patterns have a stripe shape substantially parallel with the light-incident surface.

28. A backlight assembly comprising:
   a light source emitting light;
   a light-guide plate (LGP) including a light-incident surface, a light-reflecting surface and a light-emitting surface, the light-incident surface receiving light from the light source, the light-reflecting surface having a plurality of first prism patterns spaced apart from each other and a plurality of flat portions each of which is formed between the first prism patterns, the flat portions being substantially perpendicular to the light-incident surface, and the light-emitting surface having a plurality of second prism patterns formed thereon;
   a reflective sheet disposed below the LGP; and
   at least one optical sheet disposed on the LGP,
   wherein the first prism patterns comprise:
   a first slanted surface being extended from a first flat portion of the light-reflecting surface toward the light-emitting surface;
   a second slanted surface being extended from the first slanted surface toward the light-reflecting surface;
   a connection surface formed substantially parallel with the first flat portion and being connected to the second slanted surface; and
   a third slanted surface extended from the connection surface and being connected to a second flat portion.

* * * * *